(12) United States Patent
Wellen

(10) Patent No.: US 7,684,704 B2
(45) Date of Patent: Mar. 23, 2010

(54) METHOD, APPARATUS AND SYSTEM FOR THE COMMUNICATION OF SERVICES IN AN OPTICAL ACCESS NETWORK

(75) Inventor: Jeroen Siebrand Wellen, Leusden (NL)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 678 days.

(21) Appl. No.: 10/808,683

(22) Filed: Mar. 25, 2004

(65) Prior Publication Data

US 2005/0213976 A1    Sep. 29, 2005

(51) Int. Cl.
*H04B 10/20*    (2006.01)
(52) U.S. Cl. .......................................... 398/72; 398/71
(58) Field of Classification Search ......... 398/168–169, 398/61–62, 71–72
See application file for complete search history.

(56) References Cited

U.S. PATENT DOCUMENTS

| | | | | |
|---|---|---|---|---|
| 5,189,414 | A * | 2/1993 | Tawara | 370/502 |
| 5,808,767 | A * | 9/1998 | Williams et al. | 398/70 |
| 6,014,477 | A * | 1/2000 | Barber et al. | 385/16 |
| 6,229,788 | B1 * | 5/2001 | Graves et al. | 370/230 |
| 6,334,219 | B1 * | 12/2001 | Hill et al. | 725/106 |
| 6,751,417 | B1 * | 6/2004 | Combs et al. | 398/71 |
| 6,788,169 | B1 * | 9/2004 | Schemmann et al. | 333/177 |
| 7,127,167 | B2 * | 10/2006 | Sala et al. | 398/72 |
| 2002/0061163 | A1 | 5/2002 | Bartur et al. | |
| 2002/0063924 | A1 | 5/2002 | Kimbrough et al. | |

FOREIGN PATENT DOCUMENTS

| | | |
|---|---|---|
| EP | 0 809 403 A | 11/1997 |
| EP | 1 418 691 A | 5/2004 |
| JP | 2002-141927 * | 5/2002 |

OTHER PUBLICATIONS

Shumate, P.W. "Comparing the latest high-speed access technologies: FTTx, HFC, xDSL, and wireless." IEEE Lasers and Electro-Optics Society Annual Meeting, 1998. LEOS '98. Dec. 3-4, 1998: 120-121, vol. 2.*
Cook, A. and J. Stern. "Optical fiber access-perspectives toward the 21st century." IEEE Communications Magazine, vol. 32, No. 2, Feb. 1994: 78-86.*
De Boer, I.R. and I.H. Rood. "Connecting homes with fibre-optics." GigaSURF. Aug. 29, 2001. <http://publiclan.com/FTTHStudy%20by%20Gigaport.pdf> viewed on May 27, 2008.*
Wilson, G.C. et al. "FiberVista: An FTTH or FTTC system delivering broadband data and CATV services." Bell Labs Technical Journal, vol. 4, No. 1, Jan.-Mar. 1999: 300-322.*
EP Search Report corresponding EP 05 25 1546, Aug. 1, 2005, Lucent Technologies, Inc.

* cited by examiner

*Primary Examiner*—Leslie Pascal
(74) *Attorney, Agent, or Firm*—Wall & Tong, LLP

(57) ABSTRACT

A method, apparatus and system for the communication of services in an optical access network includes transmitting services to customer premises using a passive optical downstream link and receiving services from said customer premises using an active optical upstream link. In an embodiment of the present invention, services from a central office are communicated to customer premises using a passive means for splitting an optical signal, and services from customer premises intended for the central office are communicated to the central office using active components including at least one receiver, a switch and a transmitter.

16 Claims, 3 Drawing Sheets

METHOD, APPARATUS AND SYSTEM FOR THE COMMUNICATION OF SERVICES IN AN OPTICAL ACCESS NETWORK

FIELD OF THE INVENTION

This invention relates to the field of data communication and, more specifically, to a method, apparatus and system for the communication of services to and from customer premises in an optical access network.

BACKGROUND OF THE INVENTION

With broadband access services being desired and accepted by more and more end users, the challenges of devising economically feasible optical access networks for providing broadband services to end users becomes increasingly important. Currently, typical Fiber-to-the-Home (FttH) systems deploy optical packet networks (e.g., Asynchronous Transfer Mode or Ethernet) that may substantially be characterized according to two main approaches, namely; Active Optical Networks (AONs) that utilize active fiber sites in the field, and Passive Optical Networks (PONs) that make use of a fully passive outside plant fiber.

AONs make use of relatively simple transceivers and switches using technology that originates from optical (e.g., Ethernet) data networks that, due to their volumes, are relatively inexpensive. Powered equipment in Access Concentrators in such networks is required to bridge restrictive transmission distances. The availability of power in the field also allows for different services, such as mobile telephony and wireless access, to be supported. However, such active equipment involves remote installation and the amount of components and the power they consume directly translates into maintenance requirements and high down-times that ultimately lead to additional operational expenses.

To avoid the presence of active components in the field, substantially all of the multiplexing and switching equipment of an AON may be located within a Central Office of the network. Such a network is known as a Point-to-Point network. An additional advantage of these networks is that they provide a dedicated physical medium to each subscriber, allowing for almost any change or upgrade. However, such a network consumes a considerable amount of power and space within the Central Office. In addition, for supporting existing analog services, such as broadcast television and radio, in such systems either complex optical multiplexers or expensive encoders must be installed within the Central Office and decoders must be installed in user (customer) equipment.

To overcome the problems associated with AONs, PONs were developed. By using passive tree-and-branch fiber infrastructures the amount of equipment at a Central Office may be reduced. In addition, broadcast services may be simply implemented, including analog broadcast service which may be supported by means of coarse wavelength division multiplexing. However, in current PONs complex and expensive asynchronous transmission technology and equipment is required in the upstream direction of communication. In addition, the use of passive power splitters/combiners in such networks limits the aggregate bandwidth that may be made available to users.

SUMMARY OF THE INVENTION

The present invention solves the deficiencies of the prior art by providing a method, apparatus and system for the communication of services to and from customer premises in an optical access network where services intended for customer premises are transmitted using a passive optical downstream link and services from the customer premises are received using an active optical upstream link.

In one embodiment of the present invention an apparatus for the communication of services to and from customer premises in an access network includes a passive optical path and an active optical path. The passive optical path of the apparatus includes at least a passive means for splitting a downstream optical signal intended for the customer premises. The active optical path of the apparatus includes at least one receiver for receiving services from the customer premises intended for upstream transmission, at least one switch for aggregation or concentration of the upstream traffic from different customer premises and multiplexing these onto a single upstream link, and at least one transmitter for transmitting the switched services upstream.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The present invention advantageously provides a method, apparatus and system for the communication of services (e.g., data) in an optical access network. Although various embodiments of the present invention are described herein with respect to an optical access network comprising a central office and a plurality of customer premises, the specific embodiments of the present invention should not be treated as limiting the scope of the invention. It will be appreciated by those skilled in the art informed by the teachings of the present invention that the concepts of the present invention may be advantageously applied in substantially any optical access network for the upstream and downstream communication of services in accordance with the present invention such that the size of a typical optical access network is reduced while the useable bandwidth is increased.

Figure 1:
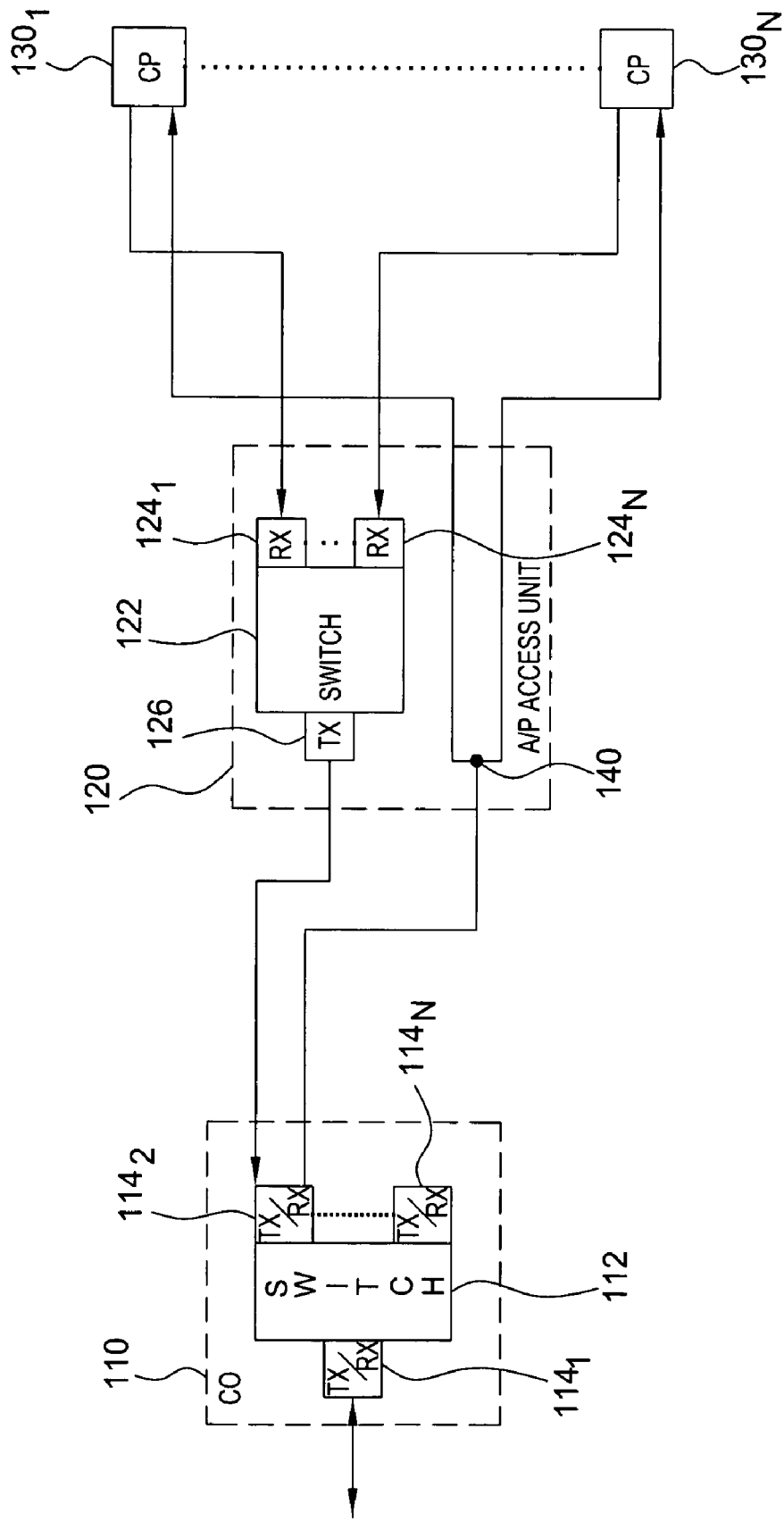
FIG. 1 depicts a high level block diagram of an embodiment of a Passive/Active Optical Network in accordance with the present invention.

FIG. 1 depicts a high level block diagram of an embodiment of a Passive/Active Optical Network in accordance with the present invention. The Passive/Active Optical Network 100 of FIG. 1 illustratively comprises a Central Office (CO) 110, an active/passive (A/P) access unit 120, and a plurality of customer premises (CPs) $130_1$-$130_N$ (collectively customer premises 130). In the Passive/Active Optical Network 100 of FIG. 1, the CO 110 illustratively comprises a switch 112 comprising a plurality of transceivers $114_1$-$114_N$ (collectively transceivers 114). Furthermore, in the Passive/Active Optical Network 100 of FIG. 1, the A/P access unit 120 illustratively comprises a switch 122 comprising a plurality of receivers $124_1$-$124_N$ (collectively receivers 124) and a transmitter 126.

The A/P access unit 120 of FIG. 1 further comprises a power splitter/combiner 140. In the Passive/Active Optical Network 100 of FIG. 1, the A/P access unit essentially comprises a passive optical path and an active optical path. The passive optical path of the A/P access unit 120 of FIG. 1 illustratively comprises the power splitter/combiner 140. The active optical path of the A/P access unit 120 of FIG. 1 illustratively comprises the plurality of receivers 124, the switch 122 and the transmitter 126. In accordance with the concepts of the present invention, the Passive/Active Optical Network 100 of FIG. 1 provides an active optical upstream link and a passive optical downstream link. Although the Passive/Active Optical Network 100 of FIG. 1 illustratively comprises a power splitter/combiner for splitting optical signals from the CO 110, in alternate embodiments of the present invention other optical splitting means, such as optical couplers and other forms of power splitters, may replace the power splitter/combiner of the present embodiment.

More specifically, for upstream communication from the CO 110 to the customer premises 130, only the active components (e.g., the switch 122, the plurality of receivers $124_1$-$124_N$ and the transmitter 126) of the A/P access unit 120 are implemented. That is, services (i.e., optical signals including data, service information, control information, etc.) from a customer premise 130 intended for the CO 110 are communicated in an upstream direction to the A/P access unit 120. In the A/P access unit 120, the services from the customer premise 130 is received by one of the receivers 124 and is communicated to the switch 122. The switch 122 routes the received service to the transmitter 126 of the A/P access unit 120 where the service is transmitted to the CO 110. In the CO 110, the transmitted service is received by a transceiver 114.

In contrast, for downstream communication in the Passive/Active Optical Network 100 of FIG. 1, only the passive components, in this embodiment the power splitter/combiner 140, are used. More specifically, when services from the CO 110 are to be broadcast to the customer premises 130, the services are communicated from the CO 110 to the A/P access unit 120. In the A/P access unit 120 the received services are split by the power splitter/combiner 140 and communicated to the customer premises 130. As such a Passive/Active Optical Network in accordance with the present invention provides superior broadcast and multicast capabilities using inexpensive and readily available components and an uncomplicated central office.

Demultiplexing is performed at the customer premises using a simple broadcast and select mechanism (not shown) as in conventional passive optical networks. The method of the present invention reduces the number of required transmitters necessary for the transmission of services by N end-users (e.g., customer premises) from N+1 transmitters to one (1) transmitter, which may result in a reduction of form factor and power requirements for an A/P access unit in accordance with the present invention, especially when considering that the photodiodes of receivers consume much less power than transceivers and diode arrays may be integrated to further reduce the form factor. The central office of a Passive/Active Optical Network in accordance with the present invention may use conventional transceivers as used in known central offices of conventional active optical networks and may implement conventional link protocols (e.g., Ethernet protocols), however, it should be noted that the receivers of a Passive/Active Optical Network in accordance with the present invention, such as the receivers 124 of the A/P access unit 120, must be capable of operating at a higher line rate due to the shared access. More specifically, passive, or rather power split downstream transmission implies sharing capacity in the time domain. Each customer premise 130 receives a packet after another. However, in dedicated (point-to-point) access, all the customer premises 130 may receive their packets simultaneously. The total capacity is the number of media or channels times the line rate on each, so to have the same capacity in a single (shared) medium or channel, the line rate needs to be N times as high as the line rate in N (dedicated) media or channels.

Figure 2:
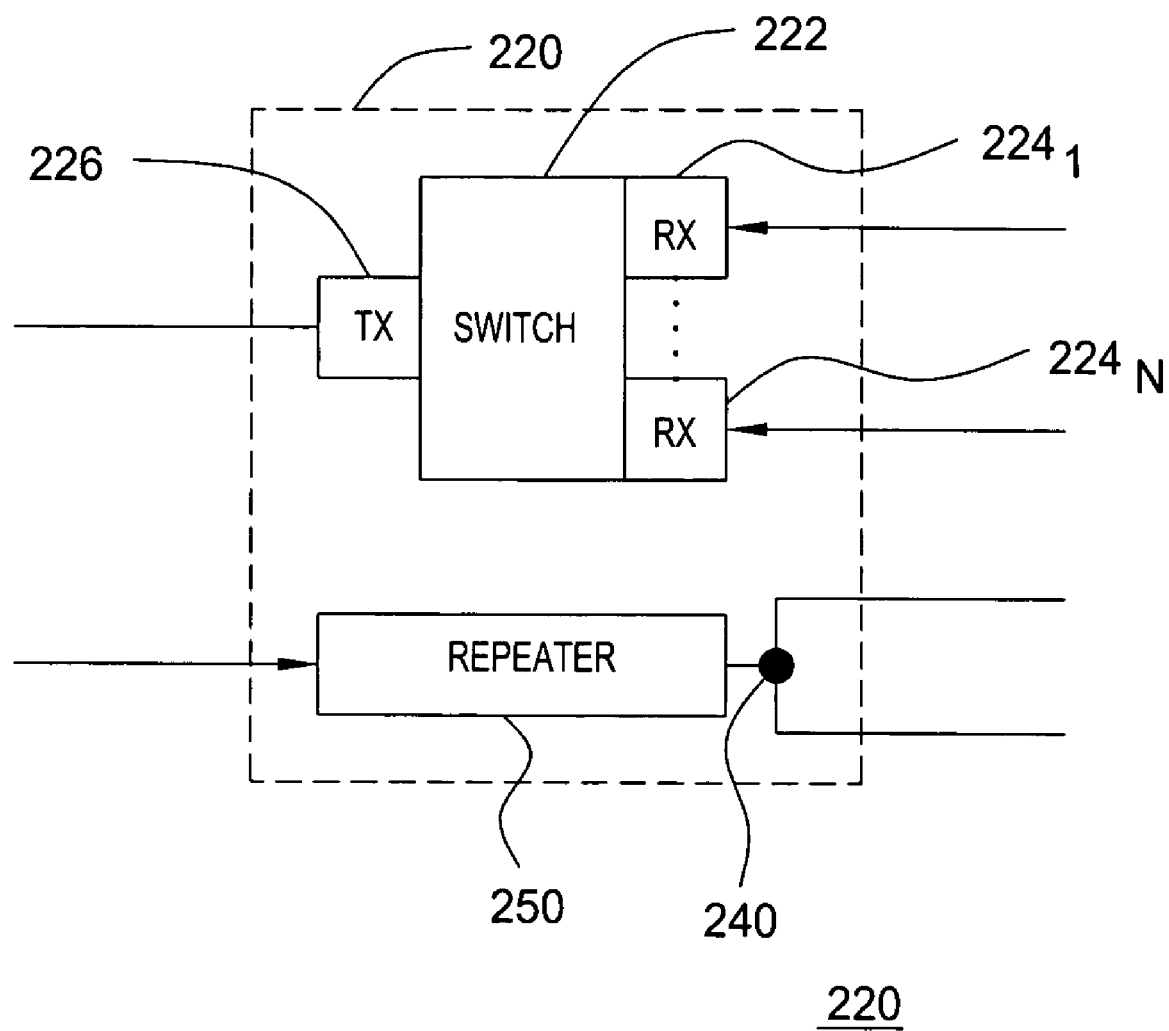
FIG. 2 depicts a high level block diagram of an alternate embodiment of an A/P access unit suitable for use in the Passive/Active Optical Network of FIG. 1.

FIG. 2 depicts a high level block diagram of an alternate embodiment of an A/P access unit suitable for use in the Passive/Active Optical Network 100 of FIG. 1. The A/P access unit 220 of FIG. 2 illustratively comprises a switch 222 comprising a plurality of receivers $124_1$-$124_N$ (collectively receivers 224) and a transmitter 226. The A/P access unit 220 of FIG. 2 further comprises a power splitter/combiner 240 and a repeater 250. The repeater 250 of the A/P access unit 220 of FIG. 2 improves the power budget of the A/P access unit 220 and allows for lower performance optics to be used in a Passive/Active Optical Network of the present invention.

Figure 3:
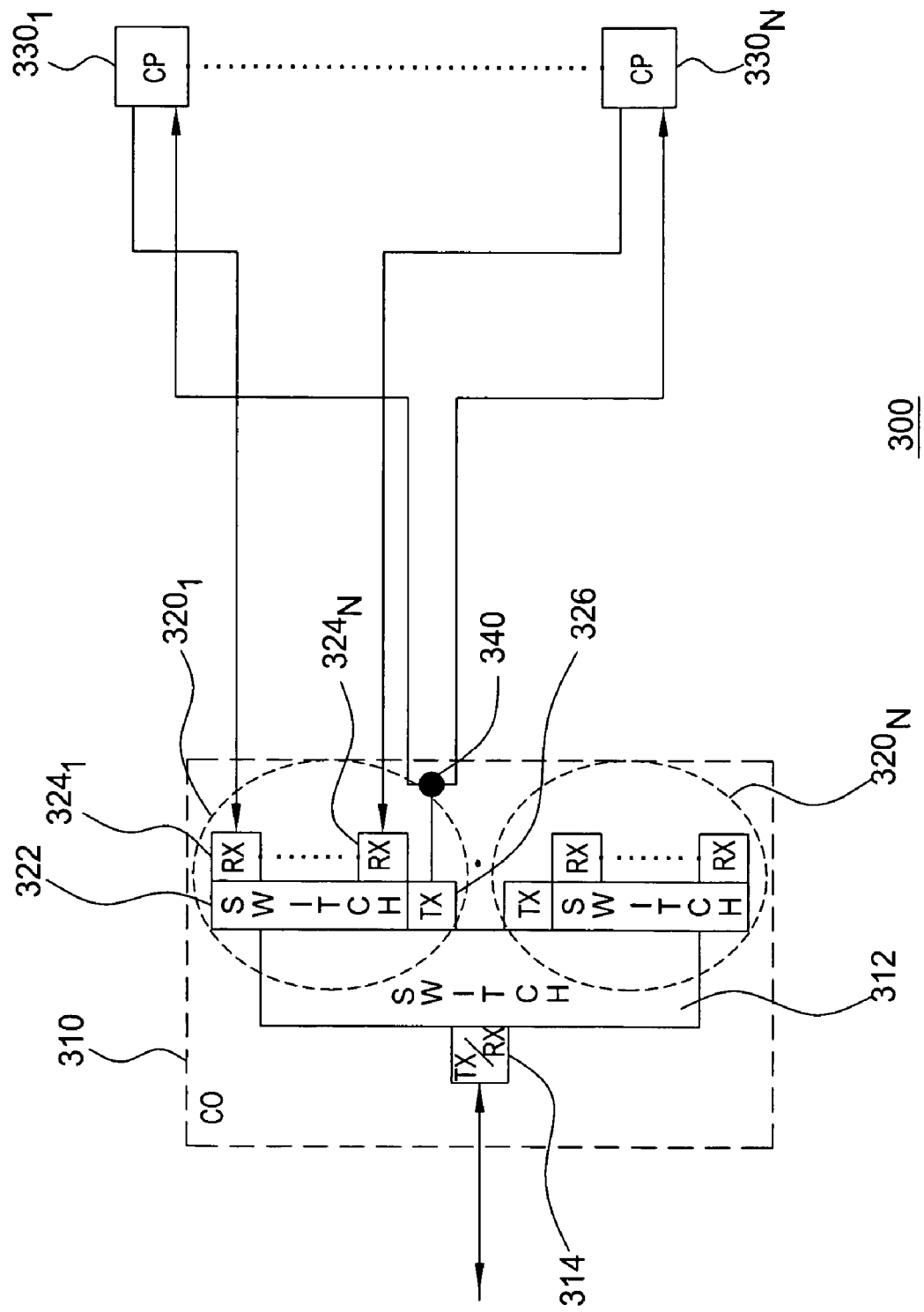
FIG. 3 depicts a high level block diagram of an alternate embodiment of a Passive/Active Optical Network in accordance with the present invention in a Point-to-Point configuration.

FIG. 3 depicts a high level block diagram of an alternate embodiment of a Passive/Active Optical Network in accordance with the present invention in a Point-to-Point configuration. The Passive/Active Optical Network 300 of FIG. 3 illustratively comprises a Central Office (CO) 310 and a plurality of customer premises $330_1$-$330_N$ (collectively customer premises 330). In the Passive/Active Optical Network 300 of FIG. 3, the CO 310 illustratively comprises a switch 312 comprising a transceiver 314 and a plurality of A/P access units $320_1$-$320_N$ (collectively A/P access units 320) in accordance with the present invention. Each of the A/P access units 320 illustratively comprise a switch 322 comprising a plurality of receivers $324_1$-$342_N$ (collectively receivers 324) and a transmitter 326. The A/P access unit 320 of FIG. 3 further comprises a power splitter/combiner 340. In accordance with the concepts of the present invention, the Passive/Active Optical Network 300 of FIG. 3 provides an active optical upstream link and a passive optical downstream link.

More specifically, for upstream communication from the CO 310 to the customer premises 330, only the active components (e.g., the switch 322 and the plurality of receivers $324_1$-$324_N$) of the A/P access unit 320 are implemented. That is, services from a customer premise 330 intended for the CO 310 are communicated in an upstream direction. In the CO 310, one of the A/P access units 320 receives the services from the customer premises 130. More specifically, in each of the A/P access units 320, respective receivers 324 receive upstream transmissions from the customer premises 130 and communicate the received transmissions to the switch 322. A respective switch 322 in each of the A/P access units 320 routes the received transmission to the switch 312 of the CO 310. Although in FIG. 3, each of the A/P access units 320 are depicted as components attached to the switch 312 of the CO 310, each of the A/P access units 320 of the Passive/Active Optical Network 300 of FIG. 3 substantially replace the transceivers one the downstream side of a conventional central office. The transceiver 314 of the CO 310 is implemented to transmit the transmissions received from the costumer premises 330.

In contrast, for downstream communication in the Passive/Active Optical Network 300 of FIG. 3, only the passive components, in this embodiment a respective power splitter/combiner 340 of the A/P access units 320, are used. More specifically, services intended for the customer premises 330 are received by the transceiver 314 of the CO 310. Services from the CO 110 to be broadcast to the customer premises 130 are communicated to the transmitter 322 of a respective A/P access unit 330 where the signals are split by a respective splitter/combiner 340 and communicated to the respective customer premises 130. Although, in the Passive/Active Optical Network 300 of FIG. 3, each of the A/P access units 320 is depicted as servicing a particular set of customer premises 330, in alternate embodiments of the present invention a particular A/P access unit may service more than one set of customer premises or alternatively, more than one A/P access unit may service a set of customer premises.

While the forgoing is directed to various embodiments of the present invention, other and further embodiments of the invention may be devised without departing from the basic scope thereof. As such, the appropriate scope of the invention is to be determined according to the claims, which follow.

What is claimed is:

1. In an optical access network, a method for the communication of services between a central office and a plurality of customer premises, comprising:
   transmitting services from said central office to said customer premises through a passive all-optical downstream path having a first termination at said central office and second terminations at said customer premises; and
   receiving services from said customer premises at said central office from an active optical upstream path having first terminations at said customer premises and a second termination at said central office.

2. The method of claim 1, wherein said passive all-optical downstream path comprises a means for splitting optical signals.

3. The method of claim 2, wherein said means for splitting optical signals comprises an optical power splitter.

4. The method of claim 1, wherein said active optical upstream path comprises:
   at least one receiver for receiving services from said customer premises intended for upstream transmission; and
   at least one switch for aggregating and multiplexing upstream traffic.

5. The method of claim 4, wherein said active optical upstream path further comprises:
   at least one transmitter for transmitting aggregated services upstream.

6. An apparatus for the communication of services between a central office and a plurality of customer premises in an optical access network, comprising:
   a splitter disposed in a passive all-optical downstream path, for splitting downstream services transmitted from said central office through said passive all-optical downstream path;
   at least one receiver disposed in an active optical upstream path, for receiving services from said customer premises from said active optical upstream path; and
   at least one switch disposed in said active optical upstream path for aggregating and multiplexing upstream traffic;
   wherein said passive all-optical downstream path has a first termination at said central office and second terminations at said customer premises;
   wherein said active optical upstream path has first terminations at said customer premises and a second termination at said central office.

7. The apparatus of claim 6, further comprising:
   at least one transmitter for transmitting aggregated services upstream.

8. The apparatus of claim 6, wherein said passive all-optical downstream path further comprises a repeater.

9. The apparatus of claim 6, wherein said active optical upstream path further comprises a transmitter.

10. The apparatus of claim 6, wherein said splitter comprises a power splitter.

11. The apparatus of claim 6, wherein said apparatus is located within a central office of an access network configured for point-to-point communication.

12. An apparatus for the communication of services between a central office and a plurality of customer premises in an optical access network, comprising:
   a means for splitting downstream services transmitted from said central office through a passive all-optical downstream path;
   at least one means for receiving services from said customer premises from an active optical upstream path; and
   at least one means for aggregating and multiplexing upstream traffic in said active optical upstream path;
   wherein said passive all-optical downstream path has a first termination at said central office and second terminations at said customer premises;
   wherein said active optical upstream path has first terminations at said customer premises and a second termination at said central office.

13. The apparatus of claim 12, further comprising:
   at least one means for transmitting aggregated services upstream.

14. A passive/active optical access network for the communication of services between a central office and customer premises, comprising:
   a central office;
   at least one customer premise; and
   an active/passive access unit for providing communication between said central office and said at least one customer premise, wherein said passive/active access network is adapted to:
   transmit services from said central office to said customer premises through a passive all-optical downstream path, wherein said passive all-optical downstream path has a first termination at said central office and a second termination at said customer premises; and
   receive services from said customer premises at said central office from said active optical upstream path, wherein said active optical upstream path has a first termination at said customer premises and a second termination at said central office.

15. The passive/active optical access network of claim 14, wherein said passive all-optical downstream path of said active/passive access unit comprises a means for splitting services from said central office.

16. The passive/active optical access network of claim 14, wherein said active optical upstream link of said active/passive access unit comprises:
   at least one means for receiving services from said at least one customer premise;
   at least one means for aggregating and multiplexing upstream traffic; and
   at least one means for transmitting aggregated services upstream to said central office.

* * * * *